(12) United States Patent
Toliusis

(10) Patent No.: US 6,712,092 B2
(45) Date of Patent: Mar. 30, 2004

(54) DIRECTIONAL FLOW CONTROL VALVE

(75) Inventor: Vytautas J. Toliusis, Paw Paw, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 23 days.

(21) Appl. No.: 10/152,239

(22) Filed: May 20, 2002

(65) Prior Publication Data

US 2003/0079784 A1 May 1, 2003

Related U.S. Application Data

(60) Provisional application No. 60/336,039, filed on Nov. 1, 2001.

(51) Int. Cl.[7] .......................... F15B 13/04; F16K 11/048
(52) U.S. Cl. ................................. 137/625.27; 137/625.5
(58) Field of Search ........................ 137/625.27, 625.5

(56) References Cited

U.S. PATENT DOCUMENTS

| | | |
|---|---|---|
| 2,873,132 A | 2/1959 | Tanner |
| 2,983,533 A | 5/1961 | Tisch |
| 3,197,172 A | 7/1965 | Brandenberg et al. |
| 3,322,433 A | 5/1967 | Rentschler |
| 3,357,675 A | 12/1967 | Brandenberg et al. |
| 4,196,937 A | 4/1980 | Falk |
| 4,494,572 A | 1/1985 | Loveless |
| 4,576,196 A | 3/1986 | Ross et al. |
| 4,764,035 A | 8/1988 | Boyd |
| 4,915,134 A | 4/1990 | Toliusis et al. |
| 5,218,999 A | 6/1993 | Tanimoto |
| 5,409,032 A | 4/1995 | Berfield |

OTHER PUBLICATIONS

Literature of Norgren Super X Series Valves.
Literature on 2 and 3 Valves "O" Series.
Technical Data from Festo on Valve Selection and Sizing.
Clippard Metric Catalog.
Parker–Hannifin Corporation Catalog 0640–2USA for "C/CW" Series Valves.
PDN Special's Report, vol. 1, Issue 6, dated Nov. 2000.
Drawing of Clippard Valve.
Fact Book & Design Guide 4–3 of Qualin Corporation ©1996.
Quad Rings Quad Lobe Seals—DMR Quad Ring Seals.

Primary Examiner—Gerald A. Michalsky
(74) Attorney, Agent, or Firm—John A. Molnar, Jr.

(57) ABSTRACT

A directional flow control valve construction particularly for use within a pneumatic or other fluid power circuit. The valve includes a body and a stem received within a bore formed in the body. The stem has a first end received within the bore and a second end which is actuable to control the opening and closing of the valve. A resilient seal ring is mounted on the stem first end portion for engagement with a corresponding valve seat formed about the bore. The seal ring has an inner lobe portion which contacts a seating surface of the valve seat and which therewith defines a sealing diameter to be of a radial extent which is less than the radial extent of a midline diameter of the seal ring.

17 Claims, 8 Drawing Sheets

DIRECTIONAL FLOW CONTROL VALVE

CROSS-REFERENCE TO RELATED CASES

The present application claims priority to U.S. Provisional Application Serial No. 60/336,039; filed Nov. 1, 2001.

BACKGROUND OF THE INVENTION

The present invention relates broadly to directional valves for controlling the flow of a fluid in a fluid power system, and more particularly to a 3-way, 2-position "button" valve of such type which is particularly adapted for use in a pneumatic circuit for controlling the operation of a cylinder or other fluid power component.

As is shown, for example, in U.S. Pat. Nos. 3,197,172; 3,357,675; 4,196,937; 4,494,572; 4,576,196; 4,915,134; 5,218,999; and 5,409,032, a variety of valve types and styles are known and used in a host of commercial, industrial, mobile, and military applications for controlling the flow of a fluid for the operation of a component in a fluid power circuit. One such type known as a "button" valve is often used to control the operation of a cylinder in a pneumatic circuit. Such valves typically are constructed as a panel-mountable body or housing having an internal bore and though which is formed two or more port openings which are coupled in fluid communication. In a three-way, two position variety, three ports are provided, the first and second being connected along a first fluid flow path, and the second and third being coupled along a second fluid flow path. A stem is slidably received within the bore for movement between a first position, which may be defined as a de-actuated, de-energized, or normally-closed position of the valve, closing the first fluid flow path and opening the second, and a second position, which may be defined as an energized, actuated, or open position of the valve opening the first fluid flow path and closing the second. As incorporated into a pneumatic circuit for the control of a cylinder or the like, the first port may be connected to line pressure, with the second port being connected to the cylinder, and the third port being open to the atmosphere as an exhaust.

The stem may extend between a first end portion which is received within the bore of the housing, and an opposite second end portion which is actuable through an open end of the bore. The stem first end portion typically has a first and an axially spaced-apart second annular valve element portion, each of which portions typically is configured to carry an O-ring coaxially-mounted thereover, each of which O-rings may be contacted in a fluid-tight sealing engagement with a corresponding seating surface defined about the housing bore for alternatingly opening and closing a corresponding one of the fluid flow paths. The stem second end portion may be generally configured as a button which is contactible to apply a force to the stem effecting its actuation from its first position to its second position.

Various actuation means may be provided depending upon the requirements of the particular application involved, such means including manual, mechanical, pneumatic, and/ or electrical control, but typically are mechanical in form such as a pivotally-mounted lever or other limit or sensor to which a roller may be attached for contact with a control surface. As the roller is contacted by the control surface, the lever is depressed which, in turn, contacts the button end for providing the actuation force moving the stem from its first to its second position. Upon the removal of the actuation force, the stem shifts back to its first position responsive to air or other fluid pressure admitted through the first port to provide an air spring return, with fluid pressure from the cylinder being relieved through the second port for exhaust through the third port.

Valves of the type herein involved are sold commercially by the Pneumatic Division North America of Parker Hannifin Corporation (Richland, Mich.), Clippard USA (Cincinnati, Ohio), Festo Corporation (Hauppauge, N.Y.), IMI Norgren Inc. (Littleton, Colo.), and Pneumadyne Inc. Plymouth, Minn.). These valves and others have proved satisfactory for a diversity of uses, and heretofore have constituted the state of the art. It is believed, however, that improvements in the construction and operation of such valves would be well-received for use in a variety of fields and applications. In this regard, it is believed a preferred construction would be operable at a reduced actuation force and would require a lower shift back pressure for return.

SUMMARY OF THE INVENTION

The present invention is directed, broadly, to directional control valves for controlling the flow of a fluid in a fluid power system. More particularly, the invention is directed to an improved 3-way, 2-position "button" valve construction of such type which is particularly adapted for use in a pneumatic circuit for controlling the operation of a cylinder or other fluid power component.

In the valve construction of the invention, a second annular seal element which controls the opening and closing of the second fluid flow path through the valve has an inner diametric extent which is formed, or which is deformed as mounted on the stem end portion, to exhibit an inner lobe portion located inwardly of the midline of the seal element which effects a seal of a given effective sealing diameter with the corresponding seating surface. As compared to a seal conventionally effected with an O-ring, the seal produced by the lobed seal element of the present invention is of a reduced effective diameter which, in turn, results in a corresponding reduction of the actuation force required to effect a seal. Moreover, by employing a seal element having an outer lobe which together with an outer lateral surface which surrounds the seating surface defines a portion of the second fluid flow path therebetween, the effective area of such flow path portion may be minimized with a corresponding reduction in flow and pressure decay through the first fluid flow path as the valve shifts from its first to its second position. Such reduction allows the valve to be shifted at a reduced pressure as compared to valves which employ a conventional O-ring which does not serve to minimize the clearance between the outer diameter thereof and the surrounding lateral surface.

The present invention, accordingly, comprises the arrangement possessing the construction, combination of elements, and arrangement of parts which are exemplified in the detailed disclosure to follow. Advantages of the invention include a valve construction which is economical to manufacture, but which is operable at a reduced actuation force and which requires reduced shift back pressure for its air or other fluid pressure spring return. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
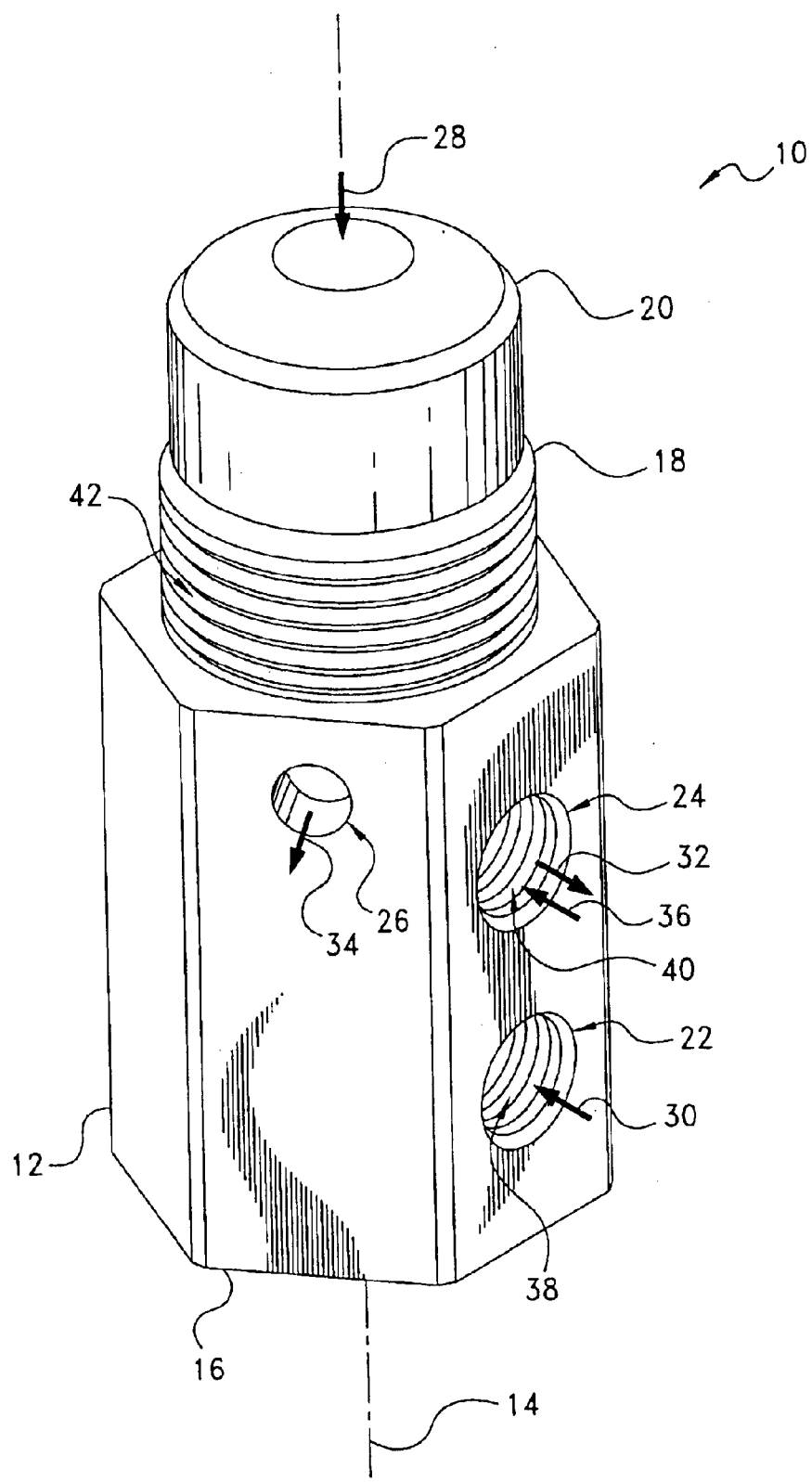
FIG. 1 is side perspective view of a representative embodiment of valve construction according to the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "right" and "left," "upper" and "lower", and "top" and "bottom" designate directions in the drawings to which reference is made, with the terms "inward," "inner," or "inboard" and "outward," "outer," or "outboard" referring, respectively, to directions toward and away from the center of the referenced element, the terms "radial" and "axial" referring, respectively, to directions or planes perpendicular and parallel to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the valve construction of the present invention are described in connection with a mechanically-actuable, normally-closed configuration which is particularly adapted for panel-mount applications within a pneumatic circuit for controlling, for example, the operation of a cylinder or other fluid power component. It will be appreciated, however, that aspects of the present invention may find application in other valve constructions, such as those of a design for other modes of actuation such as electrical or pneumatic, and in other fluid power, automation, or control systems calling for similar functionalities. Use within those such other constructions and applications therefore should be considered to be expressly within the scope of the invention herein involved.

Referring then to the figures wherein corresponding reference characters are used to designate corresponding elements throughout the several views with equivalent elements being referenced with prime or sequential alphanumeric designations, a valve construction in accordance with the present invention is shown generally at 10 in the perspective view of FIG. 1. In basic construction, valve 10 includes a tubular, generally hexagonally-shaped body, 12, which may be about 9/16-inch (1.4 cm) diameter, extends in an axial direction along a longitudinal axis, 14, intermediate a closed first end, 16, and a open second end, 18, and a generally cylindrically-shaped stem, 20, received within the body 12. Port openings 22, 24, and 26 are formed into the body 12, and are designated for the purposes herein involved as a first or supply port, 22, a second or cylinder port 24 which, as is shown, is spaced-apart axially from the first port 22 in the direction of the body second end 18, and a third or exhaust port 26 which is spaced-apart axially from the second port 24 in the direction of the body second end 18. Stem 20 is actuable, such as by means of the axially-directed forced referenced by arrow 28, from a normally-biased or de-energized orientation shown in FIG. 1 corresponding to a closed position of the valve 10, to an actuated or energized orientation corresponding to a open position of the valve. The actuation force 28 may be provided via an associated lever, roller, or other mechanical means contacting the stem 20. Such force 28 alternatively may be provided via manual, electrical, electromechanical, pneumatic or other fluid pressure, or other means.

Depending upon the requirements of the intended application, the ports 22, 24, and 26 may be formed into any of the sides of the body 12 and in differing relative angular orientations. In a typical application within a pneumatic or other fluid circuit for the control of a cylinder or other fluid power component, first port 22 may be coupled to a source of fluid pressure, i.e., system or operating pressure, which typically will be between about 5–10 psi (34–68 kPa), with the flow thereof being in the direction referenced by arrow 30. Second port 24, in turn, may be coupled to the cylinder or other component to provide working pressure thereto in the direction referenced by arrow 32, with third port 26 being vented to the atmosphere as shown by arrow 34 as an exhaust for the working pressure supplied to the cylinder via the second port 24 as indicated by the arrow 36. The system pressure 30 supplies the counter force for returning the stem 20 from its energized orientation to its de-energized orientation, and for biasing the stem in such orientation, in the manner to be described in greater detail hereinafter. Each of the first and second ports 22 and 24, which may be M5 sized, may be threaded as shown, respectively, at 38 and 40, for the connection of tubing, hoses, or other lines thereto, with the body second end also being threaded as shown at 42 for the panel or other mounting thereof via an associated nut or other fastening member (not shown). Although valve 10 is shown in FIG. 1 to be self-contained within a housing of body 12, it will be appreciated that body 12 alternatively may be provided as a block or manifold which itself may be self-contained or, otherwise, incorporated into a machine part such as in a mobile pneumatic application.

Figure 2:
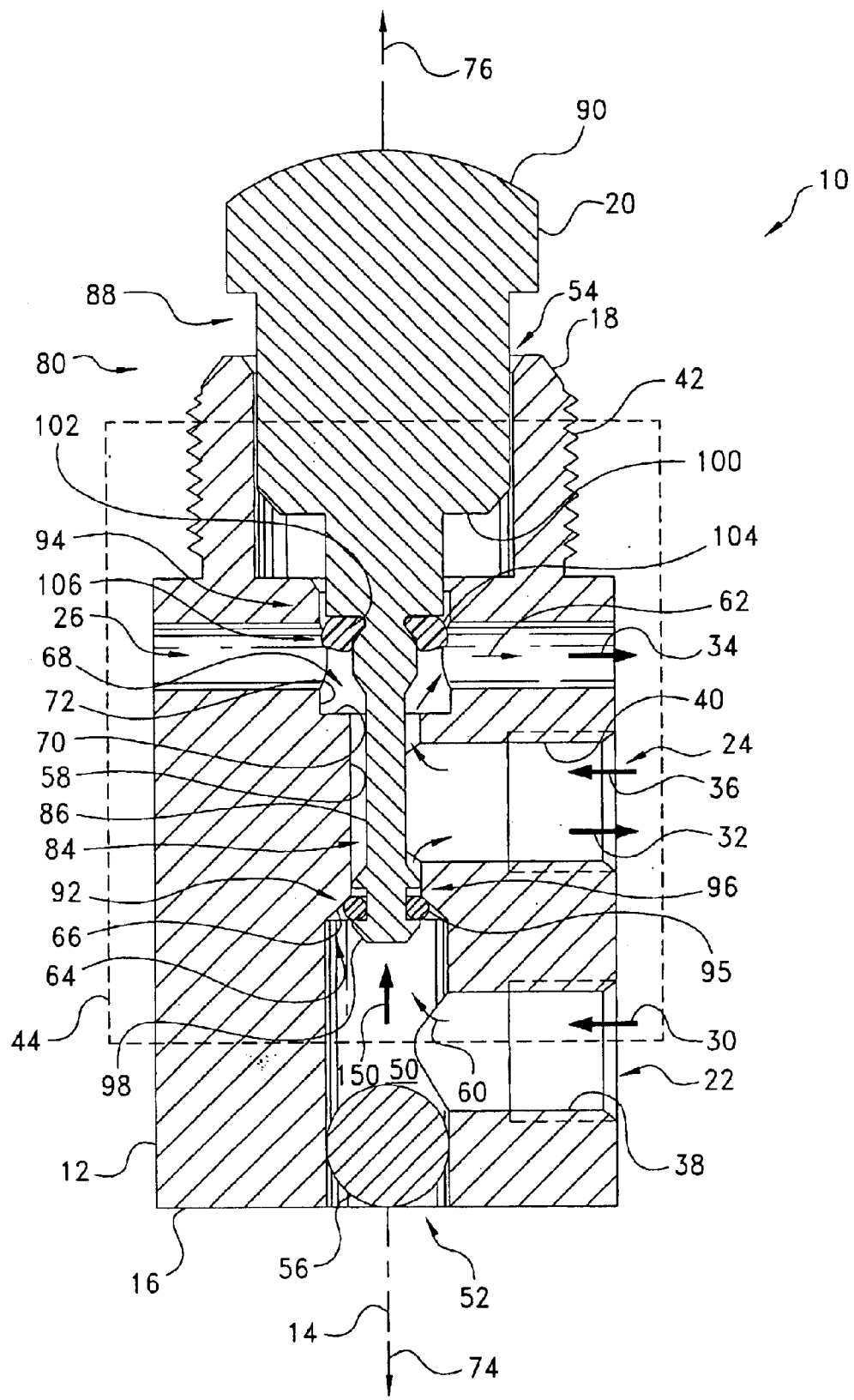
FIG. 2 is an axial cross-section view of the valve of FIG. 1 shown in a de-energized, normally-closed state.
Figure 3:
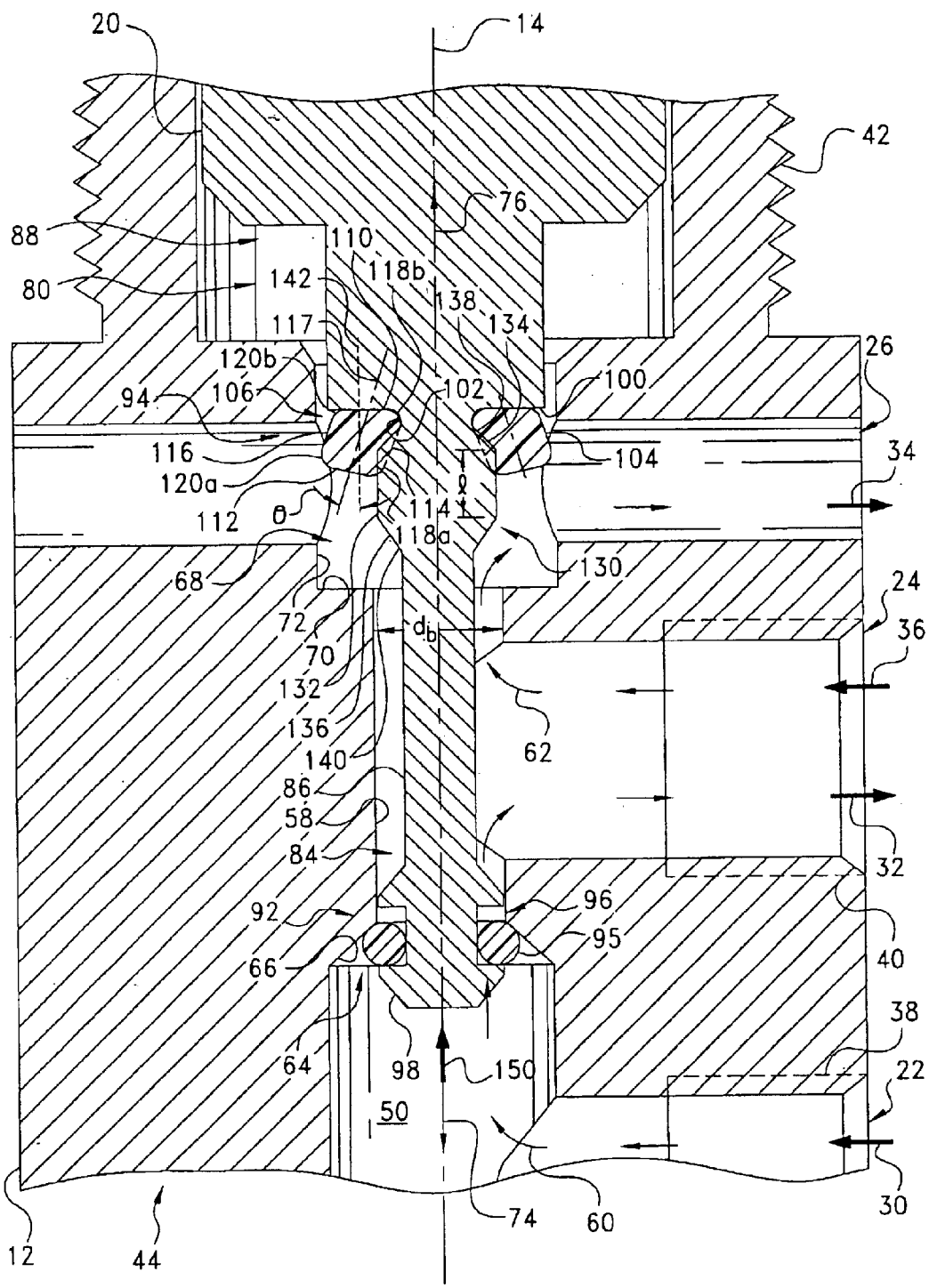
FIG. 3 is a magnified view of FIG. 2 showing the orientation of the valving elements thereof in enhanced detail.

Looking now to the cross-sectional view of FIG. 2, and with additional reference to the FIG. 3 wherein the area of the valve 10 referenced at 44 in FIG. 2 is shown in enhanced detail, body 12 may be seen to include a generally annular bore, referenced at 50, which extends in an axial direction along axis 14 intermediate a closed first end, referenced at 52 in FIG. 2, and an open second end, referenced at 54 in FIG. 2. With bore 50 being formed in the illustrative embodiment of FIG. 2 as extending through the first and second ends 16 and 18 of body 12, the bore first end 52 may be closed with a ball or other plug, 56.

Bore 50 further is shown in FIG. 2 to have a multi-stepped configuration defined by a circumferential inner surface, 58, which extends in a radial direction about axis 14. Each of the ports 22, 24, and 26, which itself may be provided as a throughbore as is shown, opens radially into the bore 50, and with another of the ports defines a fluid flow path through the valve 10. Specifically, first port 22 providing fluid pressure 30 is couplable along a first fluid flow path, referenced at 60, in fluid communication with the second port 24 providing the working pressure 32. Second port 24, in turn, is couplable along a second fluid flow path, referenced at 62, in fluid communication with the third port 26 for the venting of the working pressure 36 as exhaust 34.

Body 12 itself further is formed as having valves seats defined about the bore inner surface 58. In particular, a first valve seat, referenced at 64, including a generally frusto-conical first seating surface, 66, which faces in the axial direction of the bore first end 52 is defined axially along axis 14 intermediate the first and the second ports 22 and 24. A second valve seat, referenced generally at 68, is axially spaced-apart from the first valve seat 64 as being defined along axis 14 intermediate the second and third ports 24 and 26. Second valve seat 68 includes a generally annular second seating surface, 70, which is disposed opposite the first seating surface 66 as facing in the axial direction of the bore second end 54. The second valve seat 68 also includes a generally annular lateral wall, 72, which adjoins and surrounds the second seating surface 70 as being disposed generally transverse thereto.

With continuing reference to FIGS. 2 and 3, stem 20 may be seen to be received coaxially within the bore 50 for reciprocating sliding movement along the longitudinal axis 14 in a first axial direction, as indicated by the arrow referenced at 74, towards the bore first end 52, and in a counter, second axial direction, as indicated by the arrow referenced at 76, towards the bore second end 54. The positioning of the stem 20 along axis 14 controls the operation of the valve 10. That is, stem 20 is movable in the second axial direction 76 to the position shown at 80 in FIGS. 2–3, designated by convention as "closed," wherein the first fluid flow path 60 is closed to flow with the second fluid flow path 62 being opened to flow. Alternatively, and with momentary reference to FIGS. 4 and 5, stem 20 is movable in the first axial direction 74 to the "open" position referenced at 82 in those figures wherein the first fluid flow path 60 is opened to flow with the second fluid flow path 62 being closed to flow.

Returning again to FIGS. 2 and 3, as received for sliding movement within the bore 50, stem 20 extends along axis 14 in the second axial direction 76 from a generally elongate first end portion, referenced at 84, disposed internally within bore 50 adjacent the first end 52 thereof and having an outer surface, 86, to a second end portion, referenced at 88. As is shown, stem second end portion 88 may extend externally beyond the opening of the bore open second end 54 and thereat may be configured as a button, 90, to be better engageable in force transmitting contact by a mechanical or other actuator (not shown).

Figure 4:
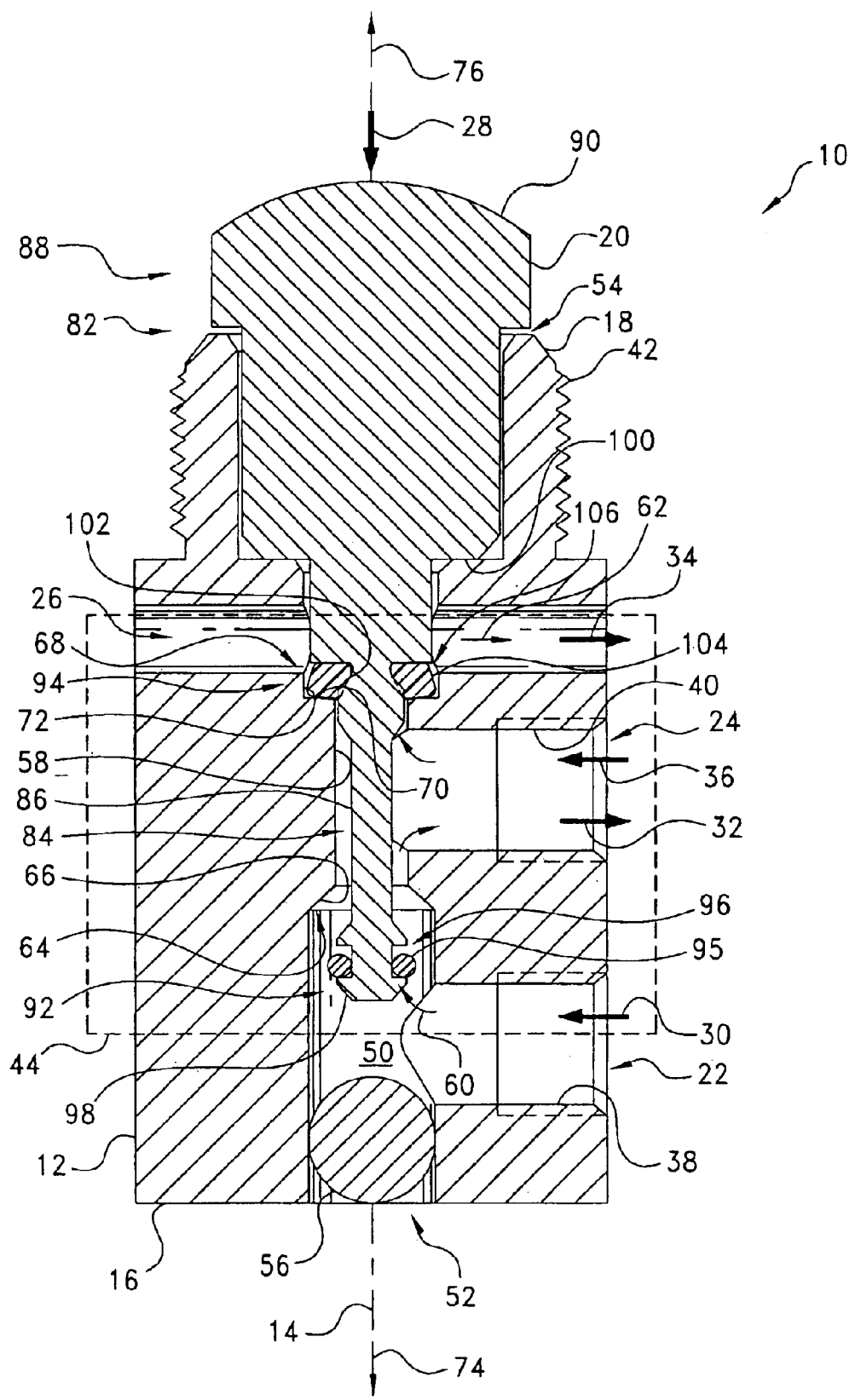
FIG. 4 is an axial cross-section view as in FIG. 2 but as showing the valve of FIG. 1 in an energized, open state.
Figure 5:
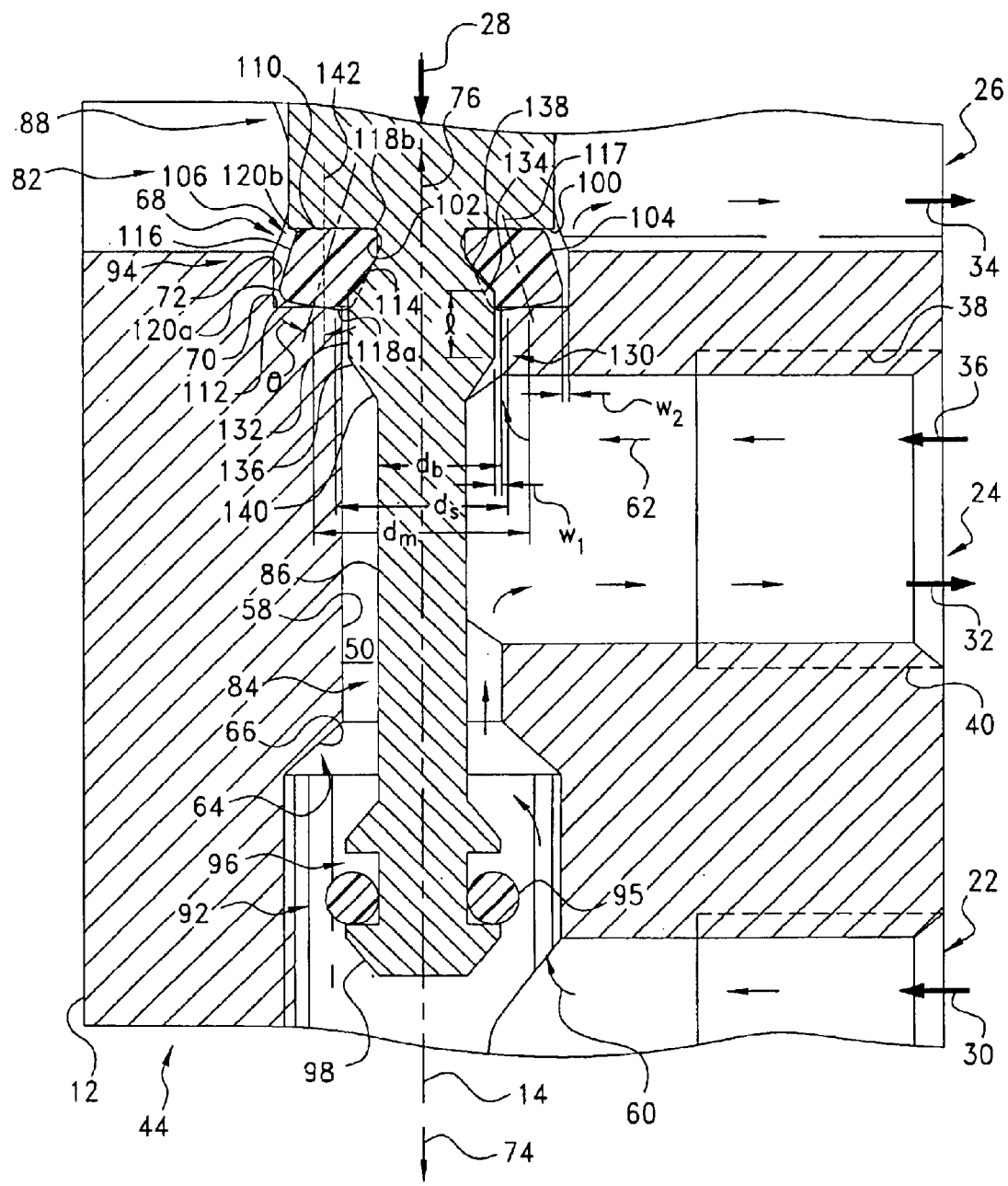
FIG. 5 is a magnified view of FIG. 4 showing the orientation of the valving elements thereof in enhanced detail.

Comparing now the orientation of the stem 20 in the open or energized state of the valve 10 shown in FIGS. 2–3 vis-à-vis the orientation in the closed or de-energized state shown in FIGS. 4–5, it will be appreciated that the opening and closing of the flow paths 60 and 62 is effected by first and second valve elements, referenced generally at 92 and 94, respectively, provided on the stem first end portion 84. As to the first valve element 92, that element is located on the stem first end portion 84 axially intermediate the bore first end 52 and the first valve seat seating surface 66. In the illustrated embodiment of valve 10, first valve element 92 is provided as a resilient O-ring or other seal, 95, which is received within an associated gland, 96, formed into an enlarged distal section, 98, of the stem first end portion 84.

In the closed position 80 of the stem 20 shown in FIGS. 2–3, seal 95 of the first valve element 92 may be seen to be compressed in a fluid-tight, sealing engagement against the seating surface 66 closing the first fluid flow path 60. It should be appreciated that such engagement also functions as a positive stop delimiting the travel of stem 20 in the second axial direction 76. Conversely, in the open position 82 of the stem 20 depicted in FIGS. 4–5, seal 95 may be seen to be spaced-apart in the first axial direction 74 from the seating surface 66 to open the first fluid flow path 60.

As to the second valve element 94, that element likewise is located on the stem first end portion 84, but as disposed axially between the second valve seat seating surface 70 and a generally annular end wall, 100, formed in the stem 20 to extend about axis 14 intermediate the stem first and second end portions 84 and 88. End wall 100 faces in the first axial direction 74 and is disposed generally transverse to the section of the stem first end outer surface 86 which is referenced at 102. In accordance with the precepts of the present invention, second valve element 94 is provided as a resilient seal ring, 104, which is mounted on the stem first end surface 86 coaxially with axis 74 as received within a half-gland or other gland or groove, 106, defined between the end wall 100 and the section 102 of the stem first end outer surface 86.

In the closed position 80 of the stem 20 shown in FIGS. 2–3, seal 104 of the second valve element 94 may be seen to be spaced-apart in the second 76 axial direction 74 from the seating surface 70 to open the second fluid flow path 62. Conversely, in the open position 82 of the stem 20 depicted in FIGS. 4–5, seal 104 is compressed in a fluid-tight, sealing engagement between the end wall 100 and the seating surface 70 closing the second fluid flow path 62. It should be appreciated that such engagement also functions as a stop delimiting the travel of stem 20 in the first axial direction 74.

Figure 6:
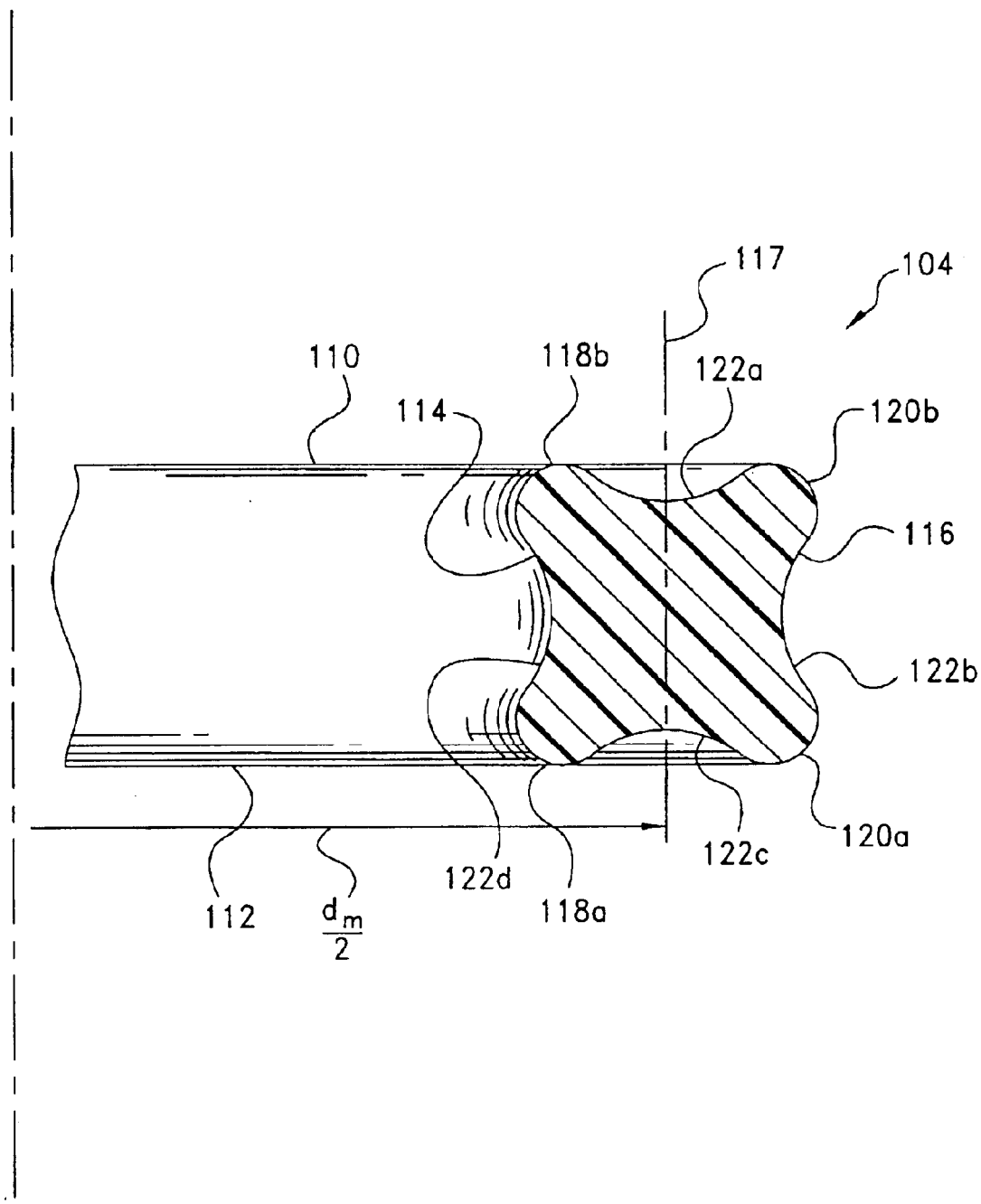
FIG. 6 is a fragmentary, axial cross-sectional view showing the free state of a representative seal ring for use with the valve of FIGS. 1–5.

Referring now momentarily to FIG. 6, an illustrative seal ring 104 for use in the valve 10 of the present invention is shown in enhanced detail. Seal ring 104 is configured its free state shown in FIG. 6 as having and axially spaced-apart upper and lower end faces, 110 and 112, respectively, and adjoining radially spaced-apart inner and outer diameter faces, 114 and 116, respectively, which faces 114 and 116 define therebetween a midline, 117, which, in turn, defines a midline diameter of a given radial extent referenced at $d_m/2$ in FIG. 6. Together, each of the end faces 110 and 112 adjoin with each of the inner and outer diameter faces 114 and 116 to define corresponding lobe portions therebetween, with a pair of inner or minor diameter lobes, 118a–b, being defined radially inwardly of the midline diameter $d_m$, and a pair of outer or major diameter lobes, 120a–b, being defined radially outwardly of the midline diameter $d_m$. With concave or other recessed portions, 122a–d, being formed to extend between the lobes 118 and 120, seal ring 104 may be seen in such respect to exhibit a generally X-shaped cross-section. Seals of such type are commonly termed quad or M-rings, and are further described in U.S. Pat. Nos. 2,873,132; 2,983,533; 3,322,433; and 4,764,035.

Returning to the several views of FIGS. 2–5, in the embodiment of valve 10 shown in those figures, the stem first end portion 84 further is formed as having a radially outwardly extending enlarged or "boss" portion, referenced generally at 130, having a generally-cylindrical peripheral surface, 132, of a given axial extent, referenced at "l."Boss peripheral surface 132 extends along its axial extent l in the second axial direction 76 to an upper shoulder portion, 134, disposed intermediate the stem second end portion 88 and the second valve seat seating surface 70, and in the first axial direction 74 to a lower shoulder portion, 136. The upper shoulder portion 134 has a generally-conical surface, 138, which adjoins the boss peripheral surface 132 and which extends therefrom in the second axial direction 76 as angled radially-inwardly. The lower shoulder portion 136, in turn, similarly has a generally-conical surface, 140, which adjoins the boss peripheral surface 132 and which extends therefrom in the first axial direction 74 as angled radially-inwardly.

As may be seen best in FIG. 3, as mounted on the stem first end portion 84 with its inner diameter face 114 being supported on stem first end outer surface 86 and, particularly, on the upper shoulder portion 134 thereof, seal ring 104 in its installed state assumes, as is shown, a stressed orientation which is partially depicted in phantom for comparative purposes of illustrating the deformation thereof from the free state. In such orientation, midline 117, as extending from the lower end face 112 to the upper end face 110 in the second axial direction 76, may be seen to be tilted or angled radially inwardly, such as by the angle referenced at θ defined between the midline 117 and a corresponding vertical axis designated at 142. Such tilting, as effected by the shoulder portion 134, itself effects a corresponding axial displacement towards the first axial direction 74 of the inner lobe 118a relative to the outer lobe 120a. Accordingly, and as may be seen best with reference now to FIG. 5, in the open position 82 of the stem 20, the seal ring inner lobe 118a, as shown in phantom for illustrative purposes, can be made to contact the seating surface 70 without substantial contact of the outer lobe 120a therewith. A sealing diameter, referenced at $d_s$, thereby may be defined to be of a radial extent which is smaller than the midline diameter $d_m$ and only marginally larger, e.g., by about 0.01 inch (0.254 mm) or less, than the inner diameter, referenced at $d_b$, of the adjoining inner surface 58 of bore 50. As compared to the force required to effect a seal of a given or specified pressure having a diameter of $d_m$, such as would be effected with an O-ring, the sealing diameter of which is determined by its inside diameter plus its cross-section diameter, the force required to effect the sealing diameter $d_s$ of the present invention is proportionately reduced. In the button configuration shown, valve 10 of the present invention, as sized to have a coefficient of flow ($C_v$) factor of about 0.20 (corresponding to a flow rate ($Q_n$) of about 200 l/min), may be actuated with an applied force 28 of about 0.25 lb (1.1 N) or less, and typically of about 0.125 lb (0.55 N) or less, at a system pressure of between about 5–10 psi (34–68 kPa).

In general service, but as may depend particularly upon the requirements of the intended application, stem 20 may be biased in its closed position 80 shown in FIGS. 2–3 responsive to the pressure spring force, as represented by the arrow designated at 150 in those figures, of the fluid pressure 30 admitted via first port 22 and acting on the stem first valve element 92 in the second axial direction 76. In such position 80 of stem 20, the angled surface 140 of the lower shoulder portion 136 may be seen to define with the second valve seat lateral wall 72 a portion of the second fluid flow path 62. Advantageously, the angled orientation of the surface 140 minimizes restriction and, accordingly, pressure drop along that portion of the flow path 62, and thereby promotes maximum flow between ports 24 and 26 for the venting of the working pressure 36 from port 24 as the exhaust 34 from port 26.

Upon the application of the actuation force referenced at 28 in FIGS. 4–5, the biasing of pressure spring force 150 is unbalanced and the stem 20 is shifted in the first axial direction 74 to its open position 82. In such position, the boss peripheral surface 132 may be seen to define with the confronting area of the bore inner surface 58 a generally-annular first gap or clearance, referenced at $w_1$ in FIG. 5, which defines a portion of the second fluid flow path 62. Similarly, the seal ring outer lobe 120a defines with confronting second valve seat lateral wall 72 a generally-annular second clearance, referenced at $w_2$ in FIG. 5, which defines another portion of the second fluid flow path 62. In a typically configuration of valve 10, each of the clearances $w_1$ and $w_2$ may be about 0.005 inch (0.127 mm) or less, and in the case of clearance $w_2$, is incrementally smaller than the clearance which would be obtained between the outer radius of an O-ring and the lateral wall 72. Together, the clearances $w_1$ and $w_2$ minimize the effective flow area and, accordingly, the flow rate and pressure decay, as stem 20, upon the cessation of the applied actuation force 28, is shifted back by the balancing of the pressure spring force 150 from its energized, open position 82 of FIGS. 4–5 to its de-energized, normally-closed position 80 of FIGS. 2–3. The effective flow rate is further determined by the boss axial extent l which will be appreciated to define the length of the clearance $w_1$, the pressure drop along such clearance being proportional to such length. It has been observed that the minimum pressure required to effect the shift back of the stem 20 of valve 10 is appreciably less than comparable valve constructions heretofore known in the art, generally specifying a minimum shift back or return pressure of between about 3–4 psi (20.4–27.2 kPa), with a minimum return pressure of less than about 1 psi (6.8 kPa) having been achieved with valve 10 of the present invention.

Figure 7:
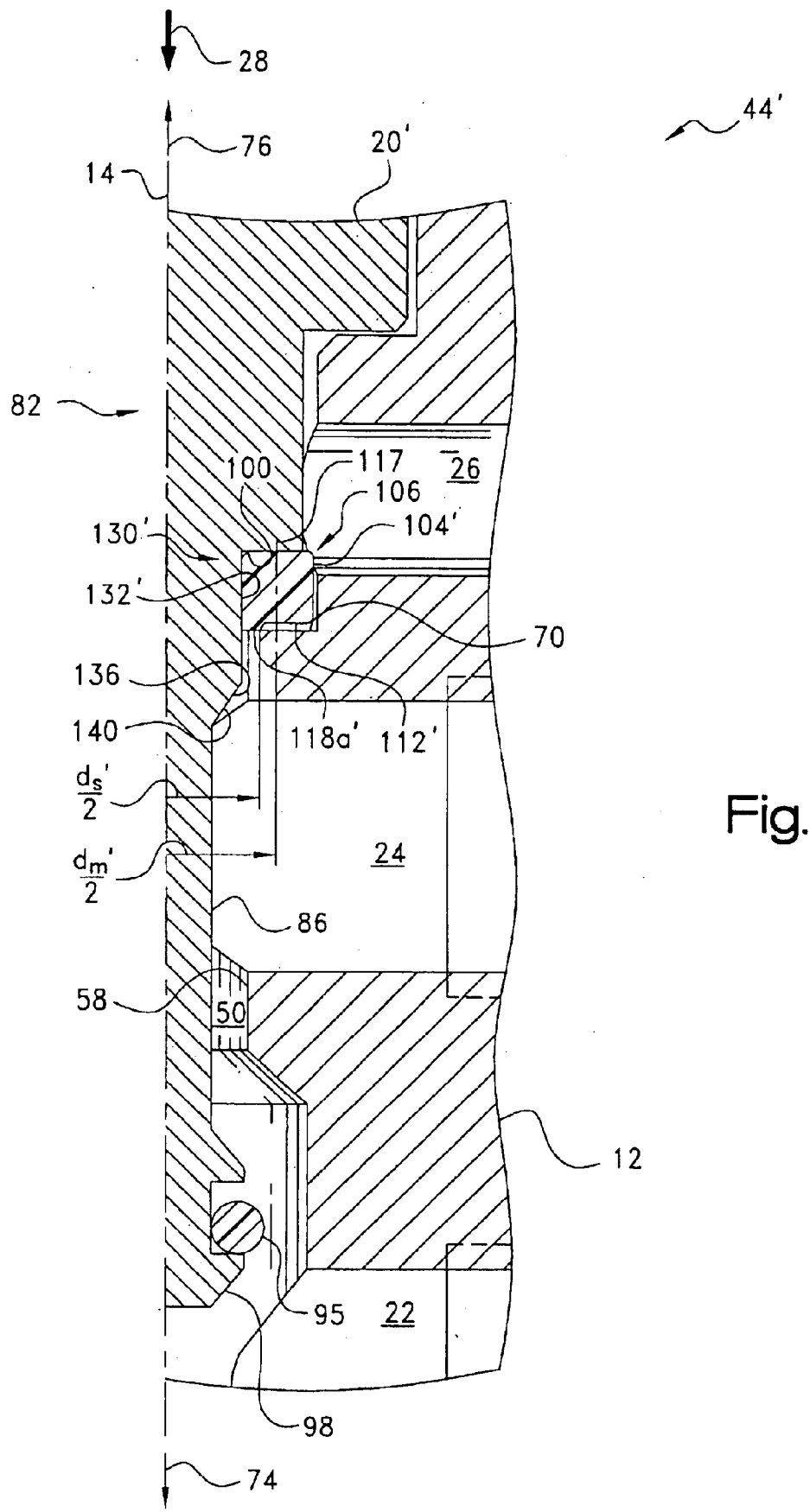
FIG. 7 is a fragmentary, magnified axial cross-section view of a alternative embodiment of the valve construction according to the present invention.

Looking next to FIG. 7, an alternative embodiment of valve 10 of the present is shown in the magnified view referenced generally at 44'. In such embodiment, boss portion 130 is formed as shown at 130' on stem 20' as having a general uniform diametric extent, with the peripheral surface 132' thereof extending from the end wall 100 to the lower shoulder 136. Further in such embodiment, seal ring 104 is configured as is shown at 104' to be formed in its free state as having an inner lobe portion 118a' which extends axially in the first axial direction 74 from the lower end face 112', but without an outer lobe portion 120a. In such way, the sealing diameter referenced at $d_s'/2$ again may be defined between the seal lobe portion 118a' and the second valve seat seating surface 70 as being disposed radially inwardly of the midline diameter referenced at $d_m'/2$.

Figure 8:
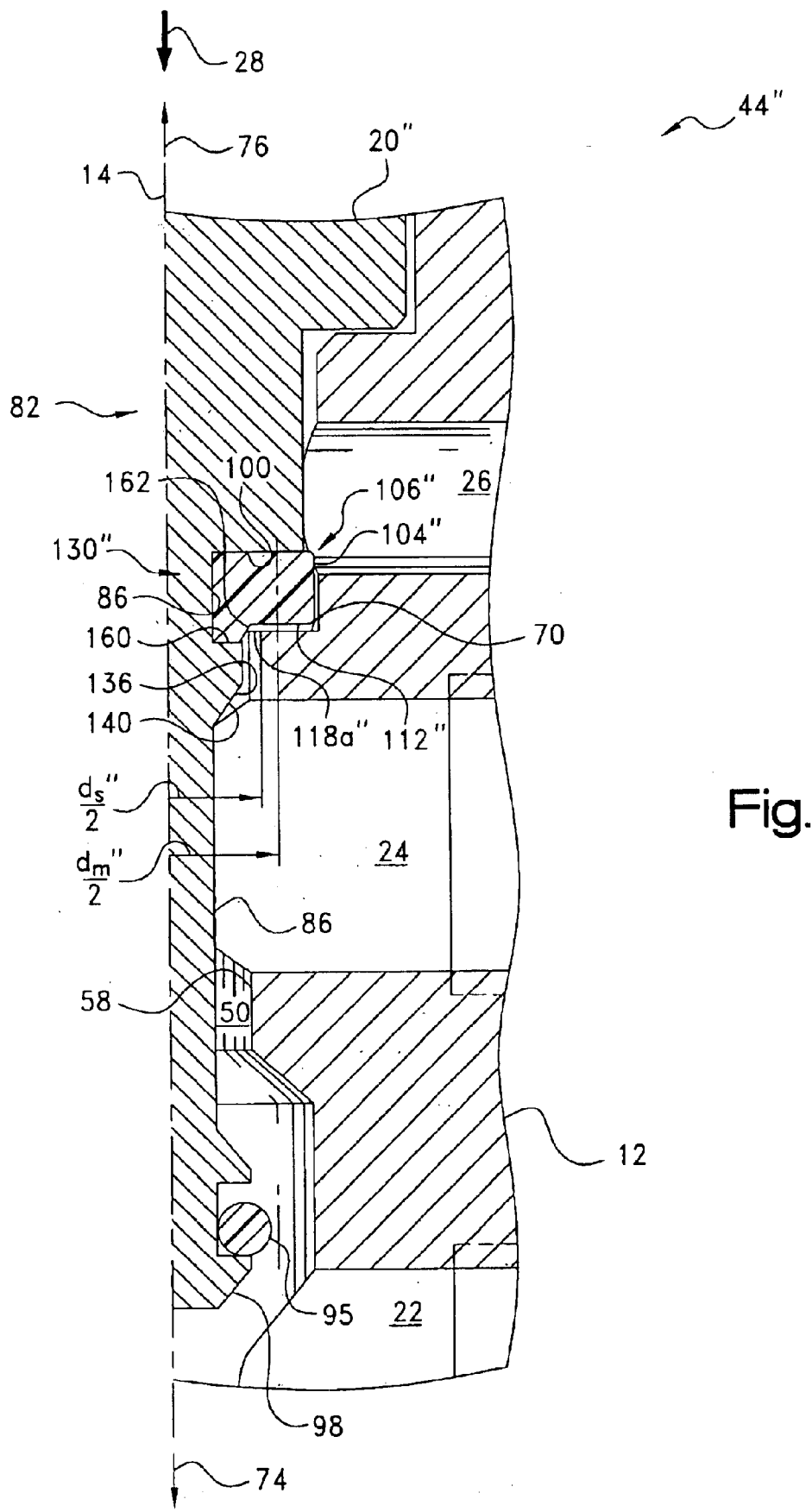
FIG. 8 is a fragmentary, magnified axial cross-section view of another alternative embodiment of the valve construction according to the present invention.

Referring now lastly to FIG. 8, another alternative embodiment of valve 10 of the present is shown at 44". In such embodiment, gland 106 is formed as is shown at 106" as defined on the stem 20" first end outer surface 86 between end wall 100 and an axially spaced-apart lower end, 160. Lower end wall 160 may be seen to have a smaller radial extent than end wall 100, and to be formed intermediate the end wall 100 and the lower shoulder portion 136. Seal ring 104", which is received within gland 106", is configured similarly to ring 104' of FIG. 7 as being formed in its free state as having an inner lobe portion 118a" which extends axially in the first axial direction 74 from the lower end face 112", but again as without an outer lobe portion 120a. In this way, the sealing diameter referenced at $d_m'/2$ may be defined between the lobe portion 118a" and the edge 162 of second valve seat seating surface 70 as disposed radially inwardly of the midline diameter referenced at $d_m''/2$. In either of embodiments shown in FIGS. 7 and 8, each of the seal rings 104' and 104" respectively may be provided as either mounted as a separate element or as molded-in-place or otherwise formed within its corresponding gland.

Thus, a directional control valve construction is described which is economical to manufacture and which provides reliable operation with reduced actuation force and shift back pressure requirements.

Depending upon their materials of construction, the components of the valve assembly of the present invention may be fabricated by molding, forging, machining, or other conventional forming processes. Unless otherwise specified, materials of construction are to be considered conventional for the uses involved. Such materials generally will be corrosion resistant and otherwise selected for compatibility with the fluid being transferred or for desired mechanical properties. Preferred materials for the body 12 and stem 20 includes plastics and other polymeric materials, as well as ferrous or nonferrous metals such as mild steel, stainless steel, and brass. Preferred plastic materials include poly (ether ether ketones), polyimides, polyamides, polyolefins such as polypropylenes and high molecular weight polyethylenes, polyetherimides, polybutylene terephthalates, nylons, fluoropolymers such as polytetrafluoroethylenes, polysulfones, polyesters, polyethylene terephthalates, acetal homo and copolymers, and polyvinyl chlorides.

Suitable materials for each of the seals 95 and 104, which may be formed of the same or of different materials, include natural rubbers such as Hevea, as well as thermoplastic, i.e., melt-processible, or thermosetting, i.e., vulcanizable, synthetic rubbers such as fluoropolymers, chlorosulfonate, polybutadiene, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A valve assembly for directing the flow of a fluid therethrough comprising:

a body including a generally annular bore extending in an axial direction along a longitudinal axis intermediate a first end and an open second end, the bore having an inner surface which extends in a radial direction about the longitudinal axis, and the body having ports which open radially into the bore including a first port, a second port spaced-apart axially from the first port in the direction of the bore second end and being couplable through the bore in fluid communication with the first port along first fluid flow path, and a third port spaced-apart axially from the second port in the direction of the bore second end and being couplable through the bore in fluid communication with the second port along a second fluid flow path, and the body having valve seats defined about the bore inner surface including a first valve seat disposed axially intermediate the first and the second port, and a second valve seat disposed axially intermediate the second and the third fluid port, the second valve seat having a seating surface and an adjoining lateral wall, the seating surface facing axially in the direction of the bore second end and extending about the bore generally transverse to the bore inner surface, and the lateral wall being disposed generally transverse to and surrounding the seating surface;

a generally cylindrical stem coaxially received within the bore for reciprocating sliding movement along the longitudinal axis in a first axial direction towards the first end of the bore to a first position opening the first fluid flow path and closing the second fluid flow path, and in a counter second axial direction towards the second end of the bore to a second position closing the first fluid flow path and opening the second fluid flow path, the stem extending along the longitudinal axis from a first end portion received internally within the bore to a second end portion, the stem first end portion having an outer surface;

a first valve element located on the stem first end portion axially intermediate the bore first end and the first valve seat, the first valve element being axially-spaced apart from the first valve seat in the direction of the bore first end to open the first fluid flow path when the stem is moved to the first position, and contacting the first valve seat in a sealing engagement closing the first fluid flow path when the stem is moved to the second position; and a second valve element located on the stem first end portion axially intermediate the stem second end portion and the seating surface of the second valve seat, the second valve element contacting the seating surface of the second valve seat substantially along a sealing diameter closing the second fluid flow path when the stem is moved to the first position, and being axially spaced-apart from the second valve seat in the direction of the bore second end to open the second fluid flow path when the stem is moved to the second position, the second valve element being formed as a resilient seal ring mounted coaxially on the outer surface of the stem first end portion, the seal ring having radially spaced-apart inner and outer diameter faces and adjoining axially spaced-apart upper and lower end faces, the inner diameter face being supported on the stem first end portion and defining with the outer diameter face a midline diameter of a given radial extent therebetween, the inner diameter face and lower end face adjoining to define a inner lobe portion therebetween disposed radially inwardly of the midline diameter, the inner lobe portion contacting the seating surface of the second valve seat in the first position of the stem and defining the sealing diameter therebetween to be of a radial extent which is smaller than the radial extent of the midline diameter.

2. The valve assembly of claim 1 wherein:

the seal ring outer diameter face and lower end face adjoin to define an outer lobe portion therebetween radially outwardly of the midline diameter; and the outer surface of the stem first end portion is formed to define a radially-outwardly extending upper shoulder portion disposed intermediate the second valve seat seating surface and the stem second end portion, the inner diameter face of the seal ring being supported on the upper shoulder portion such that the inner lobe portion thereof is displaced axially relative to the outer lobe portion in the direction of the seating surface.

3. The valve assembly of claim 1 wherein:

the seal ring outer diameter face and lower end face adjoin to define an outer lobe portion therebetween disposed radially outwardly of the midline diameter; and the seal ring outer lobe portion and the second valve seat lateral wall having in the first position of the stem a given radial clearance therebetween which defines portion of the second fluid flow path.

4. The valve assembly of claim 3 wherein the radial clearance between the seal ring outer lobe portion and the second valve seat lateral wall is about 0.005 inch (0.127 mm) or less.

5. The valve assembly of claim 1 wherein the seal ring comprises an elastomeric material.

6. The valve assembly of claim 5 wherein the elastomeric material is selected from the group consisting of natural rubbers, synthetic rubbers, and copolymers and blends thereof.

7. The valve assembly of claim 1 wherein the seal ring is configured as a quad ring.

8. The valve assembly of claim 1 wherein the stem is formed as having a generally annular end wall extending about the longitudinal axis intermediate the stem first and second end portions, the end wall facing axially in the direction of the bore second end and being disposed generally transverse to the outer surface of the stem first end portion to define a gland therebetween, the seal ring being receiving within the gland and being compressed in the first position of the stem between the end wall and the seating surface of the second valve seat.

9. The valve assembly of claim 8 wherein the outer surface of the stem first end portion is formed to define a radially-outwardly extending boss portion having a peripheral surface, the boss portion peripheral surface and the bore inner surface having in the first position of the stem a given radial clearance therebetween which defines portion of the second fluid flow.

10. The valve assembly of claim 9 wherein the radial clearance between the boss portion peripheral surface and the bore inner surface is about 0.005 inch (0.127 mm) or less.

11. The valve assembly of claim 9 wherein the outer surface of the stem first end portion is formed to define a lower shoulder portion adjoining the peripheral surface of the boss portion and extending radially-inwardly therefrom, the lower shoulder portion defining with the second valve seat lateral wall in the second position of the stem a portion of the second fluid flow path.

12. The valve assembly of claim 1 wherein:

the stem is biasable in the second position by a fluid pressure admitted through the first port; and the stem is movable from the second position to the first position by an applied force directed axially on the second end of the stem in the direction of the bore first end.

13. The valve assembly of claim 12 wherein the applied force is about 0.125 lb (0.55 N) or less for a fluid pressure of between about 5–10 psi (34–68 kPa).

14. The valve assembly of claim 12 wherein the stem second end extends axially in the direction of the bore second end beyond the opening of the bore second end.

15. The valve assembly of claim 1 wherein:

the bore inner surface has a given inner diameter;

the second valve seat seating surface adjoins the bore inner diameter; and the seal ring sealing diameter exceeds the bore inner diameter by about 0.01 inch (0.254 mm) or less.

16. The valve assembly of claim 1 having a coefficient of flow ($C_v$) factor of about 0.20.

17. The valve assembly of claim 1 wherein:

the stem is movable from the first position to the second position by a minimum fluid pressure admitted through the first port; and the minimum fluid pressure is less than about 1 psi (6.8 kPa).

* * * * *